US008010482B2

(12) United States Patent
Andersen et al.

(10) Patent No.: US 8,010,482 B2
(45) Date of Patent: Aug. 30, 2011

(54) LOCALLY COMPUTABLE SPAM DETECTION FEATURES AND ROBUST PAGERANK

(75) Inventors: Reid Marlow Andersen, Seattle, WA (US); Christian Herwarth Borgs, Seattle, WA (US); Jennifer Tour Chayes, Seattle, WA (US); John E Hopcroft, Ithaca, NY (US); Kamal Jain, Bellevue, WA (US); Seyed Vahab Mirrokni, Seattle, WA (US); Amit Prakash, Munhall, PA (US); Shang-Hua Teng, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 12/041,474

(22) Filed: Mar. 3, 2008

(65) Prior Publication Data
US 2009/0222435 A1    Sep. 3, 2009

(51) Int. Cl.
*G06F 15/00*    (2006.01)
*G06F 15/18*    (2006.01)
(52) U.S. Cl. .............. 706/62; 706/14; 706/15; 706/18; 706/20; 706/45; 706/47; 706/52
(58) Field of Classification Search .................. None
See application file for complete search history.

(56) References Cited

U.S. PATENT DOCUMENTS

| | | | |
|---|---|---|---|
| 6,285,999 B1 * | 9/2001 | Page | 1/1 |
| 7,231,395 B2 | 6/2007 | Fain et al. | |
| 2005/0015626 A1 | 1/2005 | Chasin | |
| 2005/0289148 A1 | 12/2005 | Dorner et al. | |
| 2006/0004748 A1 | 1/2006 | Ramarathnam et al. | |
| 2006/0095416 A1 * | 5/2006 | Barkhin et al. | 707/3 |
| 2006/0122957 A1 | 6/2006 | Chen | |
| 2006/0184500 A1 | 8/2006 | Najork et al. | |
| 2007/0067282 A1 * | 3/2007 | Prakash et al. | 707/5 |
| 2007/0233777 A1 | 10/2007 | Bates et al. | |
| 2008/0082481 A1 * | 4/2008 | Joshi et al. | 707/2 |
| 2008/0147669 A1 * | 6/2008 | Liu et al. | 707/10 |
| 2009/0276389 A1 * | 11/2009 | Constantine et al. | 706/52 |

OTHER PUBLICATIONS

Zhou et al, "Transductive Link Spam Detection", AIRWeb '07, 2007, 8 pages.*
Zhou et a., "Spectral Clustering and Transductive Learning with Multiple Views", Preceedings of the International Conference on Machine Learning, 2007, 8 pages.*
Svore et al. "Improving Web Spam Classification Using Rank-Time Features", AIRWeb '07, 2007, 8 pages.*
Berkhin, "A Survey on PageRank Computing", Internet Mathematics, 2005, pp. 73-120.*
Andras A. Benczur, et al. SpamRank—Fully Automatic Link Spam Detection Work in progress http://www.searchlores.org/library/benczur.pdf. Last accessed Nov. 14, 2007, 14 pages.

(Continued)

*Primary Examiner* — Omar F Fernandez Rivas
(74) *Attorney, Agent, or Firm* — Lee & Hayes, PLLC

(57) ABSTRACT

The claimed subject matter provides a system and/or a method that facilitates reducing spam in search results. An interface can obtain web graph information that represents a web of pages. A spam detection component can determines one or more features based at least in part on the web graph information. The one or more features can provide indications that a particular page of the web graph is spam. In addition, a robust rank component is provided that limits amount of contribution a single page can provide to the target page.

19 Claims, 10 Drawing Sheets

OTHER PUBLICATIONS

Ricardo Baeza-Yates, et al. Generalizing PageRank: Damping Functions for Link Based Ranking Algorithms. SIGIR'06, Aug. 6-10, 2006, Seattle, Washington, USA. ACM 1595933697/06/0008 http://www.dcc.uchile.cl/~ccastill/papers/baeza06_general_pagerank_damping_functions_link_ranking.pdf. Last accessed Nov. 14, 2007, 8 pages.

Zoltan Gyongyi, et al. Web Spam Taxonomy http://airweb.cse.lehigh.edu/2005/gyongyi.pdf. Last accessed Nov. 14, 2007, 9 pages.

Carlos Castillo, et al. Know your Neighbors: Web Spam Detection using the Web Topology, Draft version, updated: Nov. 23, 2006. http://www.dcc.uchile.cl/~ccastill/papers/cdgms_2006_know_your_neighbors.pdf. Last accessed Nov. 14, 2007, 10 pages.

Becchetti, et al., "Link-Based Characterization and Detection of Web Spam", In Second International Workshop on Adversarial Information Retrieval on the Web, 2006, pp. 1-8.

Castillo, et al., "Know Your Neighbors: Web Spam Detection Using the Web Topology", In Proceedings of the 30th Annual International ACM SIGIR Conference on Research and Development in Information Retrieval, Association for Computing Machinery, 2007, pp. 423-430.

Zhou, et al., "Transductive Link Spam Detection", In Proceedings of the 3rd International Workshop on Adversarial Information Retrieval on the Web, Association for Computing Machinery, 2007 pp. 21-28.

PCT Search Report for PCT Application No. PCT/US2009/034963, mailed Aug. 26, 2009 (10 pages).

* cited by examiner

LOCALLY COMPUTABLE SPAM DETECTION FEATURES AND ROBUST PAGERANK

BACKGROUND

In general, when searching for information with a search engine, the number of web pages that can reasonably be returned as relevant in a given search is far too large for a human user to digest. To provide effective search methods under these conditions, methods are needed to filter from a huge collection of relevant pages, a small set of the most authoritative or definitive ones. Search engines use the link structure of a web graph to rank the importance of web pages and their relevance to a particular subject in order to facilitate the filtering process. Two of the best-known algorithms for this purpose are the page-rank algorithm and the hubs and authorities algorithm. The page-rank is the algorithm used by the Google search engine, and was originally formulated by Sergey Brin and Larry Page in their paper "The Anatomy of a Large-Scale Hypertextual Web Search Engine." It is based on the premise, prevalent in the world of academia, that the importance of a research paper can be judged by the number of citations the paper has from other important research papers. Brin and Page have transferred this premise to its web equivalent—the importance of a web page can be judged by the number of hyperlinks pointing to it from other important web pages.

The page-rank of a web page is calculated as a linear combination of two terms: (i) the sum of the page rank of each page linking to it divided by the number of links on that page, and (ii) a constant term, referred to as random restart. From a search engine marketer's point of view, this implies there are two ways in which page rank can affect the position of a page. First, the number of incoming links. Clearly, the more incoming links one has the better ranking that can be received. There is also another aspect that the algorithm informs: no incoming link can have a negative effect on the page rank of the page it points at. At worst, it can simply have no effect at all. Secondly, the number of outgoing links on the page which points at a given page affects the ranking of the latter. In other words, the ranking of a page increases if the pages pointing to it have fewer outgoing links. This implies that given two pages of equal page rank linking to a respective page, one with 5 outgoing links and the other with 10, one will get twice the increase in page rank from the page with only 5 outgoing links. These known aspects of the algorithm can be exploited by web spammers however to artificially increase the popularity of their respective web pages.

Similarly, the hubs and authorities algorithm can also be exploited. In general, hyperlinks encode a considerable amount of latent human judgment. By creating links to another page, the creator of that link has "conferred authority" on the target page. Links afford the opportunity to find potential authorities purely through the pages that point to them. Generally, this algorithm model is based on the relationship that exists between the authorities for a topic and those pages that link to many related authorities, where pages of this latter type are referred to as hubs.

Web spammers have learned how to exploit the link structure employed by ranking algorithms to improve their rank in search engines. The main method to detect web spam is based on the content of the web pages. But this is very costly in terms of processing time. Moreover, if web pages are ranked for the purpose of giving priority during the crawling stage, some information should be extracted about the web spam without yet having complete information on the content of the pages.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The subject innovation relates to systems and/or methods that facilitate identifying spam pages in a web graph and reducing ranks evaluated for spam pages. For example, a spammer can attempt to inflate a rank of a spam page via engineering link structure around the spam page. In other words, the spammer creates a set of pages (e.g. a link farm) that link to the spam page. Through linking to the spam page, the link farm contributes to the rank of the spam page evaluated by a ranking system of a search engine. For a given web graph and a target page (e.g., a page that is to be labeled as spam or non spam) within the web graph, a contribution vector can be determined. The contribution vector of the target page is a vector of contribution amounts provided by other pages within the web graph such that the sum of all individual contribution amounts yields a total rank for the target page. A supporting set of the target vector can be defined, based upon the contribution vector, to include pages within the web graph that contribute most to the total rank. According to an aspect, the supporting set includes pages that provide a contribution amount greater than or equal to a predetermined threshold value.

The supporting set of the target page can facilitate generation of one or more features based upon characteristics of the supporting set. The one or more features can be unsupervised learning features or supervised learning features. Supervised learning features require a set of previously labeled pages and utilize the previous labels to identify unlabeled pages as spam or non spam. Unsupervised learning features do no rely on previously labeled pages and can include at least one of a size of the supporting set, total contribution of the supporting set, an 12 norm computation or a conductance of the supporting set.

In addition, a robust rank system is provided that reduces effectiveness of link structure engineering in raising a rank of a spam page. The robust rank system limits contribution amounts of pages to a target page to a threshold such that individual contributions cannot exceed the threshold. Moreover, mechanisms are provided that enable determination of an approximate contribution vector. The learning features and the robust rank system can be based upon the approximate contribution vector to efficiently identify spam.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
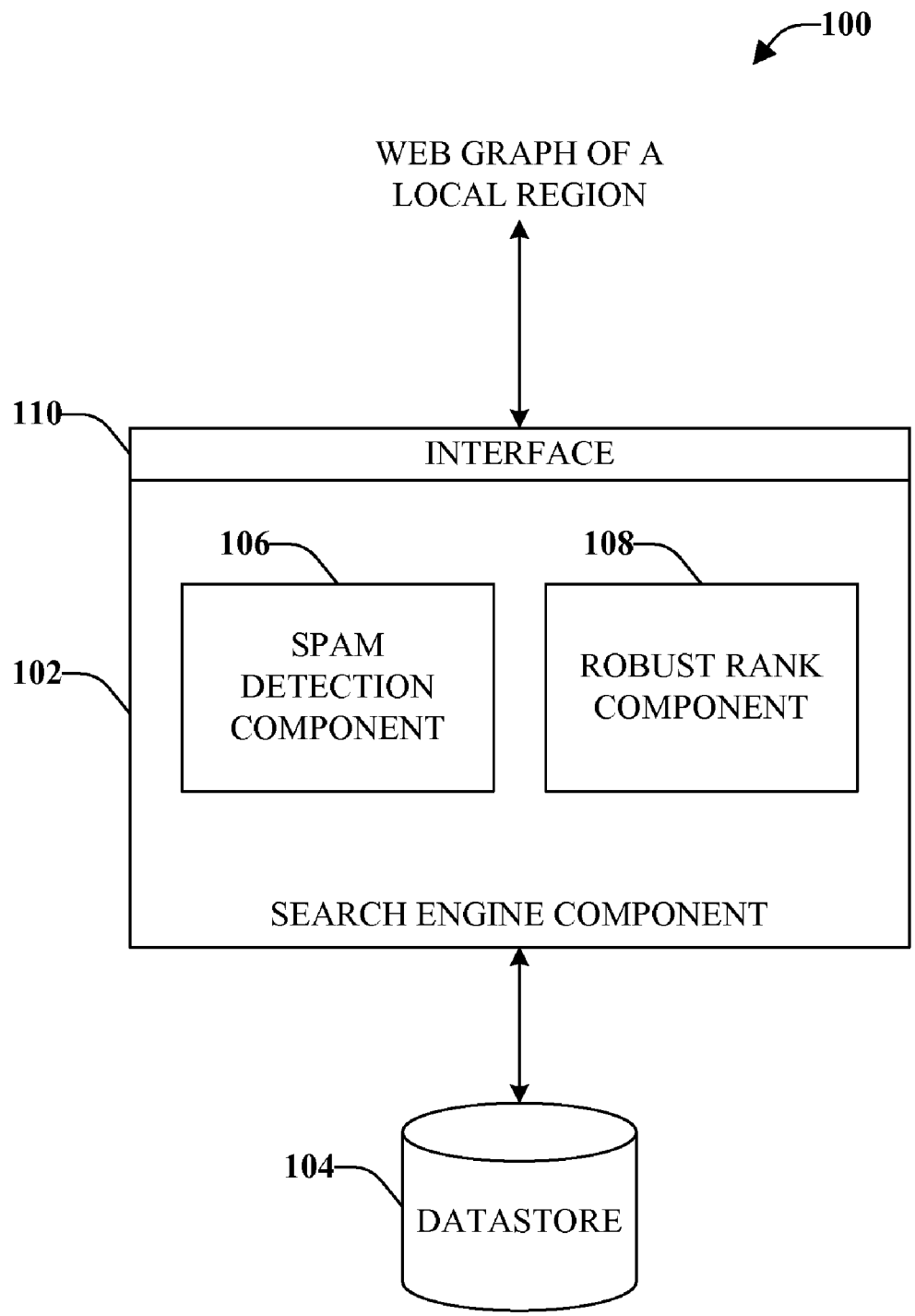
FIG. 1 illustrates a block diagram of an exemplary system that facilitates reducing spam in search results.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a search system 100 that facilitates detecting link spam in a web graph. Pursuant to an illustration, pages on an interlinked network of content (e.g., World Wide Web), can be represented as a graph, G=(V,E). The graph comprises a set of vertices, V, and a set of edges, E. The set of vertices, V, includes nodes or pages (e.g., web pages) of the graph, G. The set of edges, E, includes links between vertices (e.g., links between web pages). In one aspect, the graph, G, is a directed graph such that the edges, E, have a direction from a source vertex to a destination vertex. In the example of a web graph, wherein the vertices are web pages, the directed edge is a link (e.g., hyperlink) on the source web page that leads to the destination web page.

Typically, search engines employ ranking mechanisms that utilize link structure to determine the rank or value of a single page. For example, a particular page can be ranked highly if a large number of other pages in the web graph link to the particular page. A spammer can attempt to increase ranking of a spam web page via manipulation of the link structure around the spam web page. Pursuant to an illustration, the spammer utilizes additional pages around the spam page to provide a large contribution to the spam page through a plurality of links.

The system 100 includes a search engine component 102 that obtains, via an interface 110, a web graph for indexing and storage in a data store 104. In addition, the search engine component 102 can provide search results to a user based in part on a user query. The search results comprise pages indexed from the web graph. In accordance with an aspect, the search engine component 102 can obtain a web graph of a local region to facilitate determining spam pages. The search engine component 102 can employ a web crawler (not shown) to collect web graph information. The web graph of a local region includes a local neighborhood surrounding a target page (e.g., node or vertex of the web graph). The local neighborhood can include pages that link to or are linked from the target page of interest. Accordingly, the search engine component 102 need not capture information related to the entire web graph in order to determine the validity of the target page.

The search engine component 102 includes a spam detection component 106 that analyzes the web graph of the local region to determine if the target page is spam. The spam detection component 106 ascertains features based at least in part on a supporting set of the target page to label the page as spam or not spam. According to an aspect, the search engine component 102 can remove spam pages from search results and/or reduce rank of the spam pages in the search results to prevent interference with non-spam pages. In addition, the search engine component 102 includes a robust rank component 108 that limits effectiveness of link structure manipulation in inflating ranks of spam pages. In one embodiment, the robust rank component 108 restricts an amount that each vertex or web page is allowed to contribute to the rank of the target page. The robust rank component 108 prevents spammers from engineering a high rank for a spam page with a relatively small number of neighboring pages.

In addition, the system 100 can include any suitable and/or necessary interfaces 110, which provides various adapters, connectors, channels, communication paths, etc. to integrate the search engine component 102, the spam detection component 106 and the robust rank component 108 into virtually any operating and/or database system(s) and/or with one another. In addition, the interfaces can provide various adapters, connectors, channels, communication paths, etc., that provide for interaction with the in situ the search engine component 102, the spam detection component 106, the robust rank component 108 and any other device and/or component associated with the system 100.

Moreover, it is to be appreciated that the data store 104 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 104 of the subject systems and methods is intended to comprise, without being limited to, these and any other suitable types of memory. In addition, it is to be appreciated that the data store 104 can be a server, a database, a hard drive, a pen drive, an external hard drive, a portable hard drive, and the like.

Figure 2:
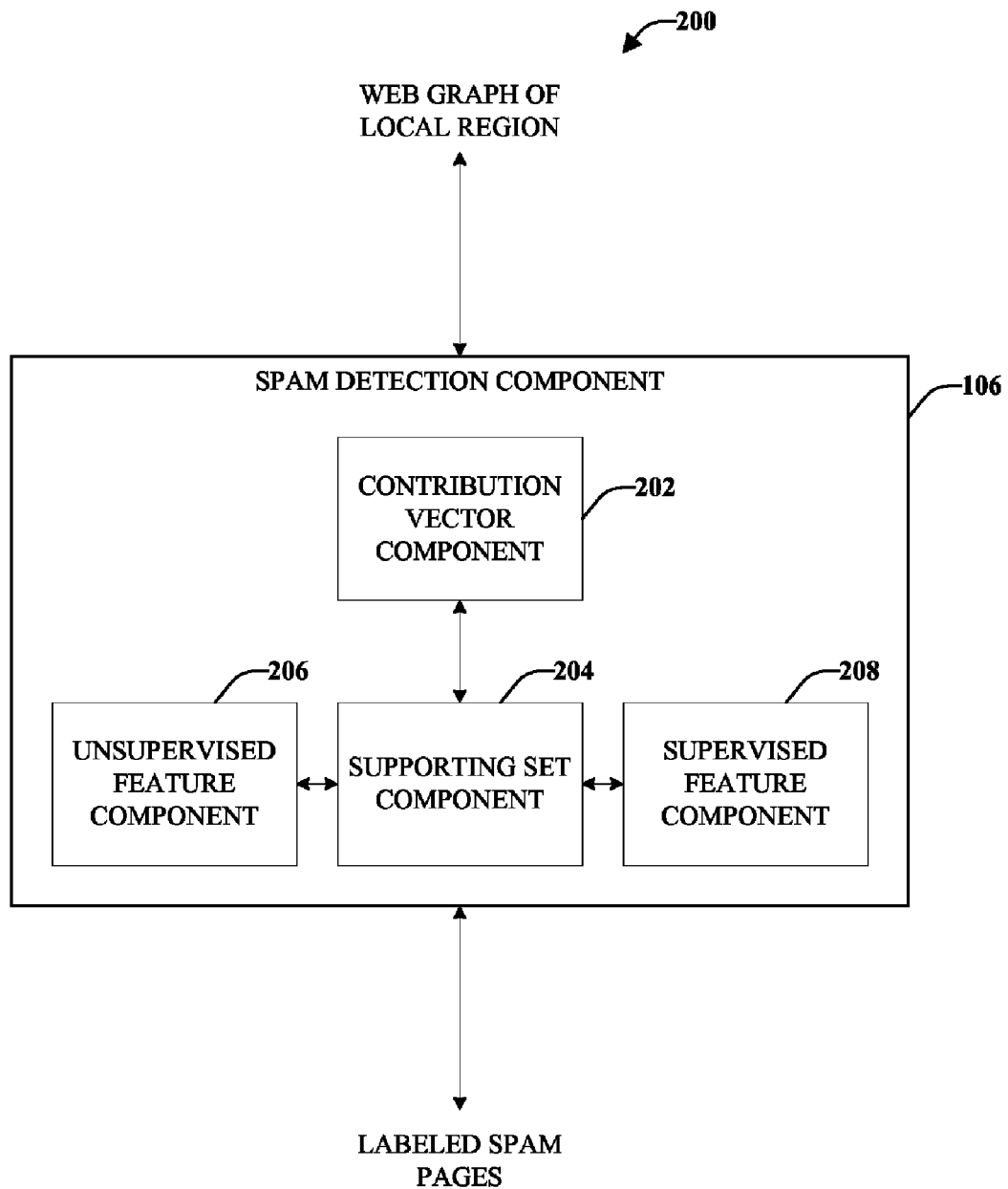
FIG. 2 illustrates a block diagram of an exemplary system that facilitates identifying spam pages in a web graph.

FIG. 2 illustrates a system 200 that facilitates labeling a web page or node as spam based in part upon features determined according to a link structure of local region. The system 200 includes a spam detection component 106 that obtains a web graph of a local region and labels spam pages contained within the web graph. As mentioned above, the web can be modeled by a directed graph $G=(V,E)$ where V is a set of web pages and E is a set of edges such that a directed edge, $(u \rightarrow v) \in E$, represents a hyperlink in page u that references page v. In addition, an adjacency matrix, A, associated with graph, G, can be defined. For each page, $u \in V$, $d_{out}(u)$ denotes an out-degree value of u and $d_{in}(u)$ represents an in-degree of u. In addition, $D_{out}$ denotes the diagonal matrix of out-degrees.

A rank of a particular web page is determined in part on the in-degree of the web page. In other words, a given web page is ranked highly if multiple pages reference the given web page via links. A ranking algorithm is typically parameterized with a teleportation constant, $\alpha$. The teleportation constant is a probability that a user restarts (e.g., jumps to a random web page) rather than proceed forward along links of a currently viewed web page. For a teleportation constant, $\alpha$, a rank vector, $pr_\alpha$, can be represented by the following:

$$pr_\alpha = \alpha \cdot 1 + (1-\alpha) \cdot pr_\alpha \cdot M$$

Pursuant to this illustration, M is a random walk transition matrix given by $M = D_{out}^{-1} A$ and 1 is a row vector of ones. A rank of given page, u, is denoted by $pr_\alpha(u)$.

According to an aspect, a personalized rank vector $ppr(\alpha, u)$ of a web page, $u \in V$, can be provided by the following:

$$ppr(\alpha, u) = \alpha \cdot e_u + (1-\alpha) \cdot ppr(\alpha, u) \cdot M$$

Pursuant to this example, M is the random walk transition matrix and $e_u$ is a row unit vector with a $u^{th}$ entry equal to one. A personalized rank matrix, $PRM_\alpha$, can be generated based upon an entire graph, G. The personalized rank matrix, $PRM_\alpha$, can be defined such that a $u^{th}$ row the matrix is a personalized rank vector of page u, given by $ppr(\alpha, u)$. The global rank vector, $pr_\alpha$, is the sum of all personalized rank vectors (e.g., rows) of the personalized rank matrix, $PRM_\alpha$. A contribution of a page, u, to the rank of another page, v, is entry (u,v) of $PRM_\alpha$, and can be denoted as $ppr_\alpha(u \rightarrow v)$. A contribution vector, $cpr(\alpha, v)$ can be a row vector whose transpose is the $v^{th}$ column of $PRM_\alpha$. In other words, the contribution vector, whose entries are the contributions of every other page to the page v, is the $v^{th}$ column. Moreover, the rank of page v is the sum of the $v^{th}$ column of $PRM_\alpha$ (e.g., the rank is the sum of all individual contributions). As utilized herein, $c = cpr(\alpha, v)$ can represent the contribution vector for a web page v. The total contribution of pages in a set, S, to the rank of page v is defined as the sum of $ppr_\alpha(u \rightarrow v)$ over all u in S and can be denoted by c(S).

The spam detection component 106 determines spam detection features based upon a web graph of a local region. In an embodiment, the web graph can contain one or more pages of interest or target pages that are analyzed and labeled as spam or not spam. The spam detection component 106 includes a contribution vector component 202 that generates at least one contribution vector. The generated contribution vector indicates all pages that contribute to a rank of a target page and the amount contributed by each page. The spam detection component 106 includes a supporting set component 204 that ascertains a supporting set based upon the generated contribution vector. The supporting set includes a set of nodes or pages that contribute significantly to the rank of the target page. The supporting set can be configurably determined based upon a threshold parameter, $\delta$ (e.g., size and content of the supporting can be adjusted for the target page based upon selection of the parameter). The supporting set includes pages that contribute an amount to the target page greater than or equal to the threshold parameter, $\delta$. Pursuant to an illustration, the supporting set component 204 can generate a $\delta$-significant supporting set, $S_\delta(v)$, for a target page, v, according to the following:

$$S_\delta(v) = \{u | ppr_\alpha(u \rightarrow v) > \delta \cdot pr_\alpha(v)\}$$

According to this example, the $\delta$-significant supporting set, $S_\delta(v)$, includes all pages, u, that contribute an amount to the rank of v that is greater than a proportion of the total rank of v, wherein the proportion is provided by the threshold parameter, $\delta$.

An unsupervised features component 206 is provided that evaluates a plurality of unsupervised learning features based at least in part on the supporting set for a target page determined by the supporting set component 204. The unsupervised learning features enable the spam detection component 106 to assess if the target page is a spam page. One feature is the size of the supporting set. Typically, size of a supporting set of a spam page is smaller than a size of a supporting set of a non spam page because a spam page receives large contributions from a small number of neighboring pages. Another feature is the contribution amount from pages in the δ-significant supporting set of a target page relative to total contribution or rank. For a target page, v, this feature can be computed according to the following:

$$\sum_{u \in S_\delta(v)} \left( \frac{ppr_\alpha(u \to v)}{pr_\alpha(v)} \right)$$

Pursuant to an illustration, each individual member of the supporting set of a spam page heavily contributes to the total rank of the spam page. Accordingly, the spam page can have a supporting set that contributes a majority of total rank of the page.

Further, the unsupervised features component 206 provides an $I_2$ norm of the δ-significant supporting set of the target page. This features represents an $I_2$ norm of the of the contributions of pages in the supporting set and is given by:

$$\sqrt{\sum_{u \in S_\delta(v)} \left( \frac{ppr_\alpha(u \to v)}{pr_\alpha(v)} \right)^2}$$

In addition, the unsupervised features component 206 considers conductance of the δ-significant supporting set, $S_\delta(v)$. The unsupervised features component 206 can determine the conductance based upon the following:

$$\text{Conductance} = \frac{\sum_{u \in S_\delta(v)} \deg(u, V \backslash S_\delta(v))}{\sum_{u \in S_\delta(v)} \deg(u)}$$

Pursuant to this example, $\deg(u, V\backslash S_\delta(v))$ is a number of links from page u to the set given by $V(G)\backslash S_\delta(v)$. For a non spam page, pages within a supporting set of the non spam page links to a variety of other pages. In contrast, pages in a supporting set of a spam page typically include pages from an engineered link farm that link to other pages within the supporting set and not pages outside the set. The spam detection component 106 labels a target page as a spam page or a non page spam based at least in part on the features generated by the unsupervised features component 206. For example, the spam detection component 106 can label a target page spam if a corresponding supporting set size is small and the set contributes a large portion to the total rank of the target page.

In addition to unsupervised learning features, the spam detection component 106 can label target pages based at least in part on supervised learning features spawned by a supervised features component 208. The supervised features component 208 utilizes a set of pages previously labeled to ascertain features that enable the spam detection component 106 to evaluate unlabeled nodes. The supervised features component 208 employs the δ-significant supporting set, $S_\delta(v)$, for a target page, v. In addition, the supervised features component 208 utilizes a set $T_\delta(v)$ that includes pages in the supporting set labeled as spam. Based in part on these two sets, the supervised features component 208 generates a feature representing a fraction of pages in the supporting set labeled as spam (e.g., the ratio between the size of $T_\delta(v)$ and the size of $S_\delta(v)$). In addition, the supervised features component 208 can generate a feature indicating contributions to the target page from pages in the supporting set labeled as spam (e.g., the ratio between the contributions from labeled pages and the contributions from all pages in the supporting set). A target page is more likely a spam page if the supervised features component 208 determines large values of the supervised learning features. For example, a spam page typically includes a high ratio of spam pages in the supporting set, wherein a majority of total rank is derived from contributions of the spam pages. Accordingly, the aforementioned ratios ascertained by the supervised features component 208 can be high for target pages that are spam pages.

Figure 3:
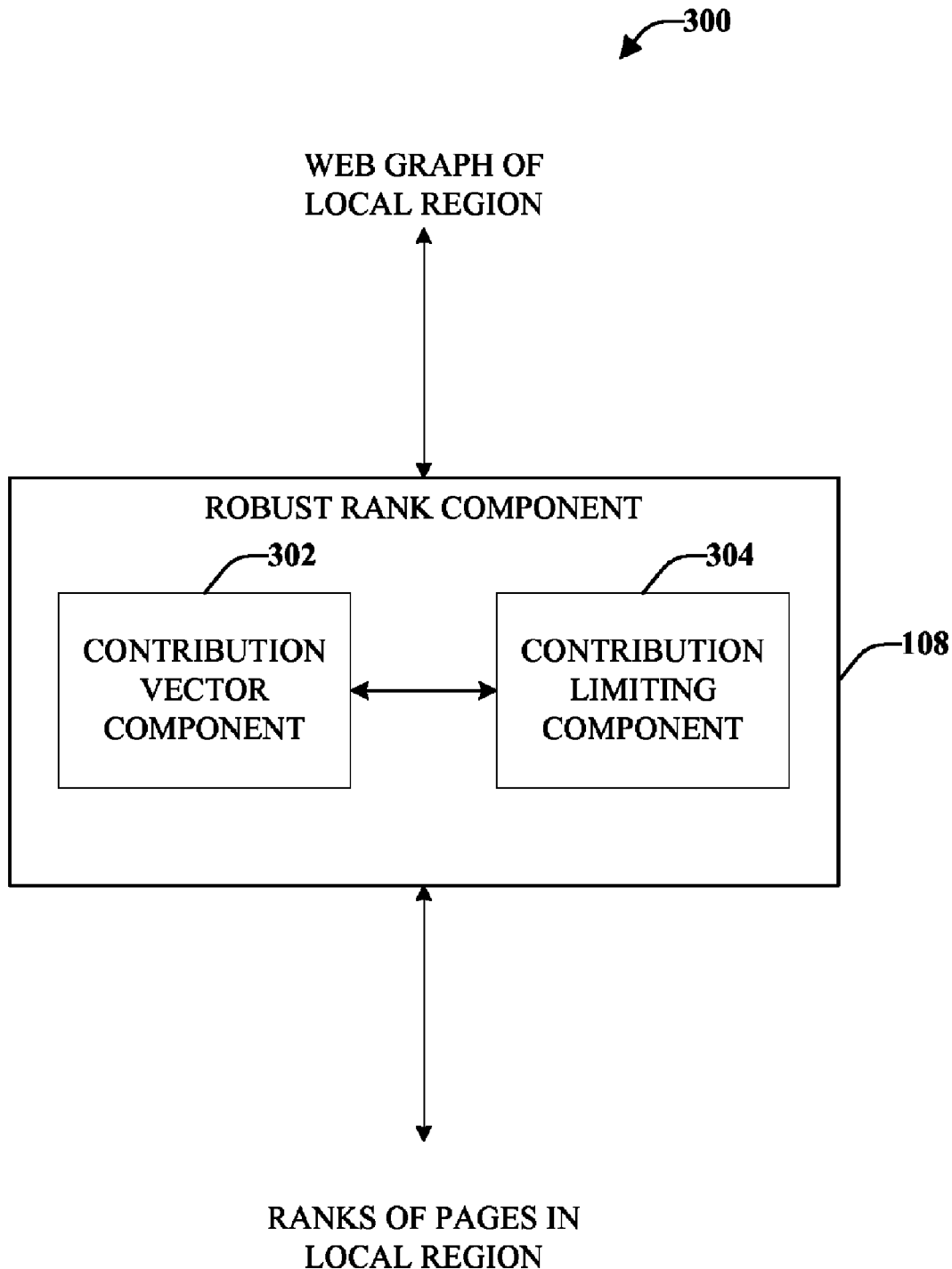
FIG. 3 illustrates a block diagram of an exemplary system that facilitates limiting effectiveness of spamming techniques in accordance with an aspect of the subject disclosure.

FIG. 3 illustrates a system 300 that facilitates a rank mechanism that is more resilient against link structure engineering. System 300 includes a robust rank component 108 that limits effectiveness of link structure manipulation in inflating ranks of spam pages. The robust rank component 108 decreases a contributive effect that the most influential pages have on a rank of a target page. The robust rank component 108 includes a contribution vector component 302 that generates a contribution vector for a target page in a web graph of a local region collected by the robust rank component 108. The generated contribution vector includes all pages that contribute (e.g., link) to a rank of a target page and, in addition, the amount contributed by each page in the vector to the total rank. The contribution vector is employed by a contribution limiting component 304 to restrict individual contribution from a particular page to a threshold. For example, the contribution limiting component 304 can decrease contributions of pages that are above the threshold to the threshold value itself. A spam page can receive a large contribution from a small number of neighboring pages. Accordingly, the contribution limiting component 304 reduces the effect of large contributions on overall rank. Thus, a spam page loses rank since a majority of contribution is derived from a small number of pages while a non spam page that derives rank from links originating from a variety of many pages is largely unaffected.

In one embodiment, a rank of a target page typically is the sum of contribution of other pages. For example, for a target page, v, the rank of page v can be determined based upon the following:

$$pr_\alpha(v) = \sum_{u \in V(G)} ppr(u, v)$$

Pursuant to this illustration, the rank of the target page is the sum of personalized ranks (e.g., contributions) from every page, u, within the web graph of the local region to the target page. The robust rank component 108 decreases contributions in excess of a threshold, δ, to the threshold value. The threshold, δ, is a configurable parameter that can be altered to customize resilience of rank system 300 to engineered link structures. For example, a small value of the threshold results in higher resilience against engineered link structures. The robust rank component 108 evaluates a rank of a target page according to the following:

$$\text{Robust}pr_\alpha^\delta(v) = \sum_{u \in V(G)} \min(ppr(u, v), \delta)$$

For a selected threshold, δ, the individual contribution of another page, u, to the rank of the target page, v, is the minimum of the amount of the contribution or the threshold, δ. The contribution of most influential pages is reduced which affects total rank of spam pages more than non spam pages.

Figure 4:
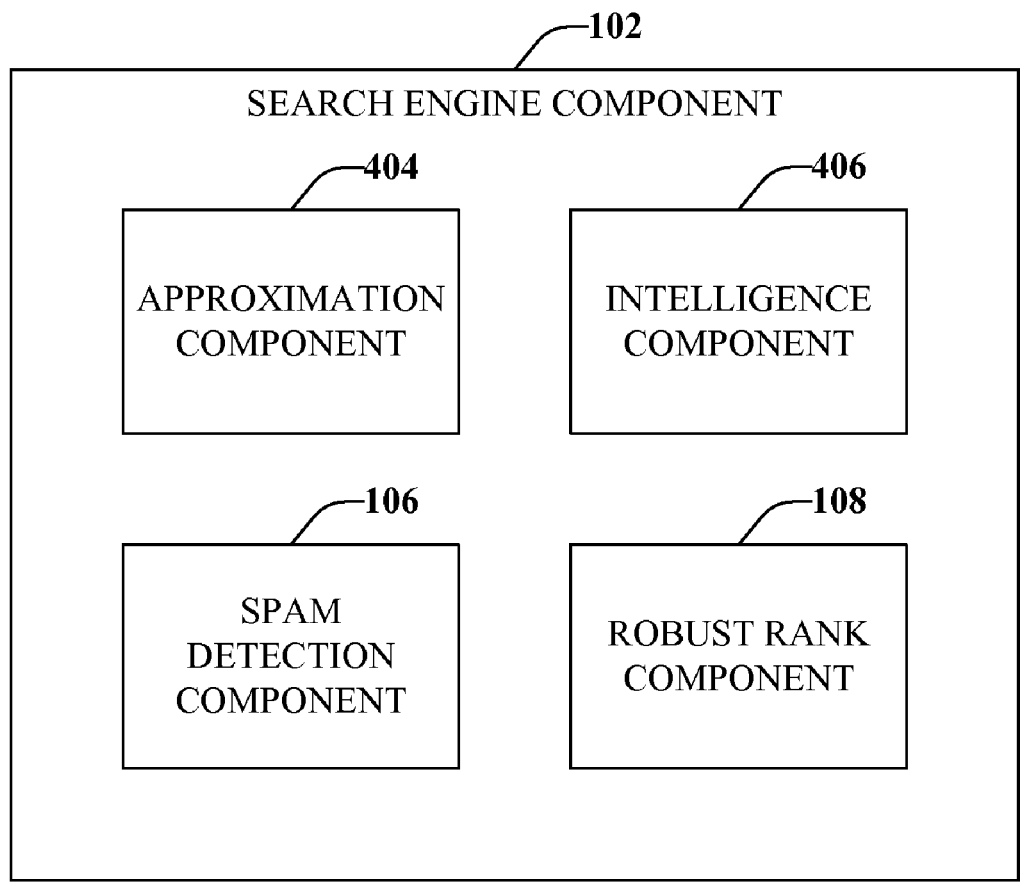
FIG. 4 illustrates a block diagram of an exemplary system enables approximation of characteristics of pages within a web graph.

FIG. 4 illustrates a search engine 102 that facilitates reducing spam pages in accordance with an aspect of the subject disclosure. The search engine 102 includes a spam detection component 106 that analyzes a web graph of a local region to determine if a target page is spam. The local region includes pages in a neighborhood surrounding a target page. In addition, the search engine component 102 includes a robust rank component 108 that decreases contributions of other pages to a rank of a target page such that no individual contribution exceeds a given threshold. An approximation component 402 is provided that generates local approximations of contribution vectors. As described supra, a contribution vector, c=cpr (α,v), of a target page, v, includes every page in a web graph that contributes to the target page. The contribution vector also includes an amount or magnitude of contribution for each page towards the rank of the target page. The approximation component 402 provides an approximate contribution vector, č, that is an ϵ-absolute approximation of the contribution vector c. The approximation component 402 examines a predetermined number of pages in a web graph. The pre-determined number is independent of the total number of pages in the web graph.

The search engine component 102 further includes an intelligence component 404. Various inferences or determinations that occur in relation to the search engine component 102, spam detection component 106, robust rank component 108 and/or the approximation component 402 can be processed by the intelligence component 404. For instance, the intelligence component 404 can infer that a target page is a spam page based at least in part on unsupervised and/or supervised features generated according to a supporting set of the target page. Moreover, the intelligence component 404 can make different determinations, such as determining an appropriate threshold value of the robust rank component 108, determining a minimum contribution for inclusion in a supporting set, etc.

Moreover, it is to be understood that the intelligence component 404 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x_1, x_2, x_3, x_4, \ldots, x_n)$, to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
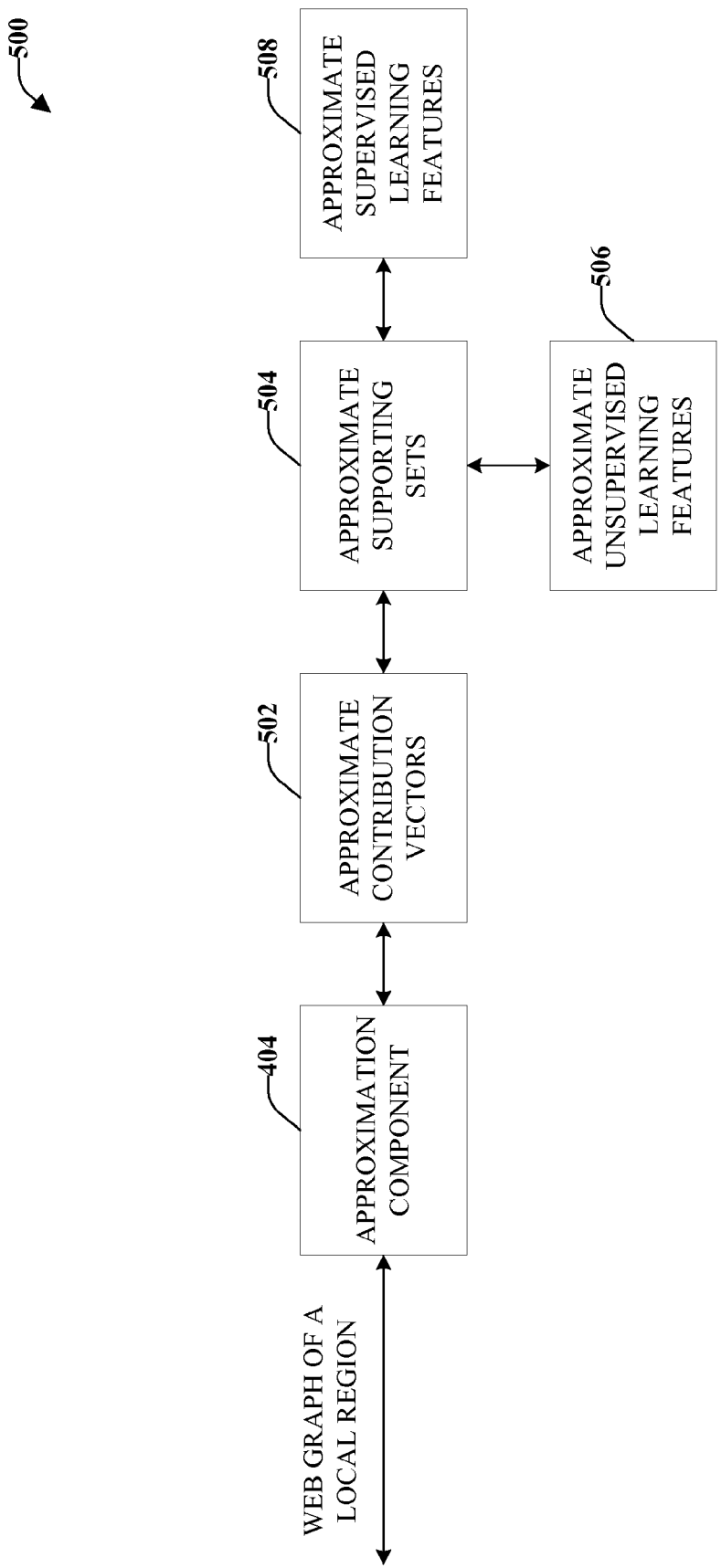
FIG. 5 illustrates a block diagram of an exemplary system that facilitates identifying spam pages based upon approximations.

FIG. 5 depicts an example 500 that illustrates an approximation component 402 and an effect of approximation on aforementioned values and features. The approximation component 402 obtains a web graph that includes a set of vertices (e.g., pages) and a set of edges (e.g., links). The approximation component 402 generates approximate contribution vectors 502 as described supra with respect to FIG. 4. The contribution vectors 502, in one embodiment, can be utilized to determine approximate supporting sets 504. Pursuant to an illustration, the contribution vectors 502 can be ϵ-approximations of a contribution vectors where $\epsilon=\delta \cdot pr_\alpha(v)$ for a definable parameter, δ. The approximate supporting sets 504 can include the sets of pages within the approximate contribution vectors 502 with a contribution amount of at least $\delta \cdot pr_\alpha(v)$.

The approximate supporting sets 504 can be employed to ascertain approximate unsupervised learning features 506. The approximate unsupervised learning features 506 are similar to the unsupervised features described supra with respect to FIG. 2. However, the approximate unsupervised learning features 506 are determined based upon the approximate contribution vectors 502 and approximate supporting sets 504. For example, the size of the δ-significant supporting set can be approximate according to the following:

$$|\tilde{S}_\delta| = |\{u | \tilde{c}(u) > \delta \cdot pr_\alpha(v)\}|$$

In addition, the contribution amount from pages in the δ-significant supporting set of a target page can be based upon approximation values in accordance with the following:

$$\sum_{u \in \tilde{S}_\delta} \left( \frac{\tilde{c}(u)}{pr_\alpha(v)} \right)$$

Similarly, the $l_2$ norm of the contribution vectors can be approximated as:

$$\sqrt{\sum_{u \in V(G)} \left( \frac{\tilde{c}(u)}{pr_\alpha(v)} \right)^2}$$

The approximate supporting sets 504 can be utilizes to generate approximate supervised learning features 508. In ascertaining the approximate supervised learning features 508, the approximate supporting sets 504 are employed to derive an approximate set, $\tilde{T}_\delta(v)$, that includes pages in the supporting set of target page, v, that have been labeled as spam. The approximate supervised learning features 508 are evaluated utilizing the same mechanisms as described supra with respect to FIG. 2. However, the approximate values are employed as opposed to absolute values for the contribution vectors, supporting sets and labeled spam set.

Figure 6:
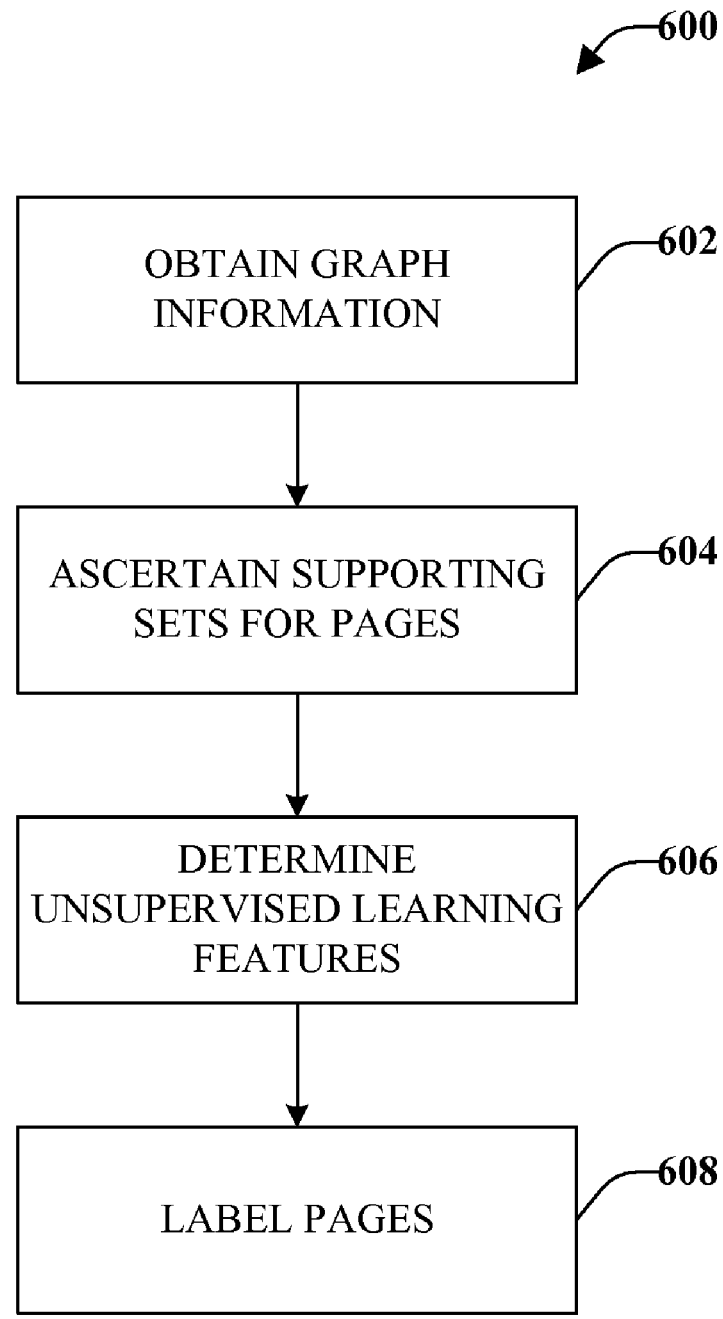
FIG. 6 illustrates an exemplary methodology that facilities identifying spam pages based upon unsupervised features.
Figure 7:
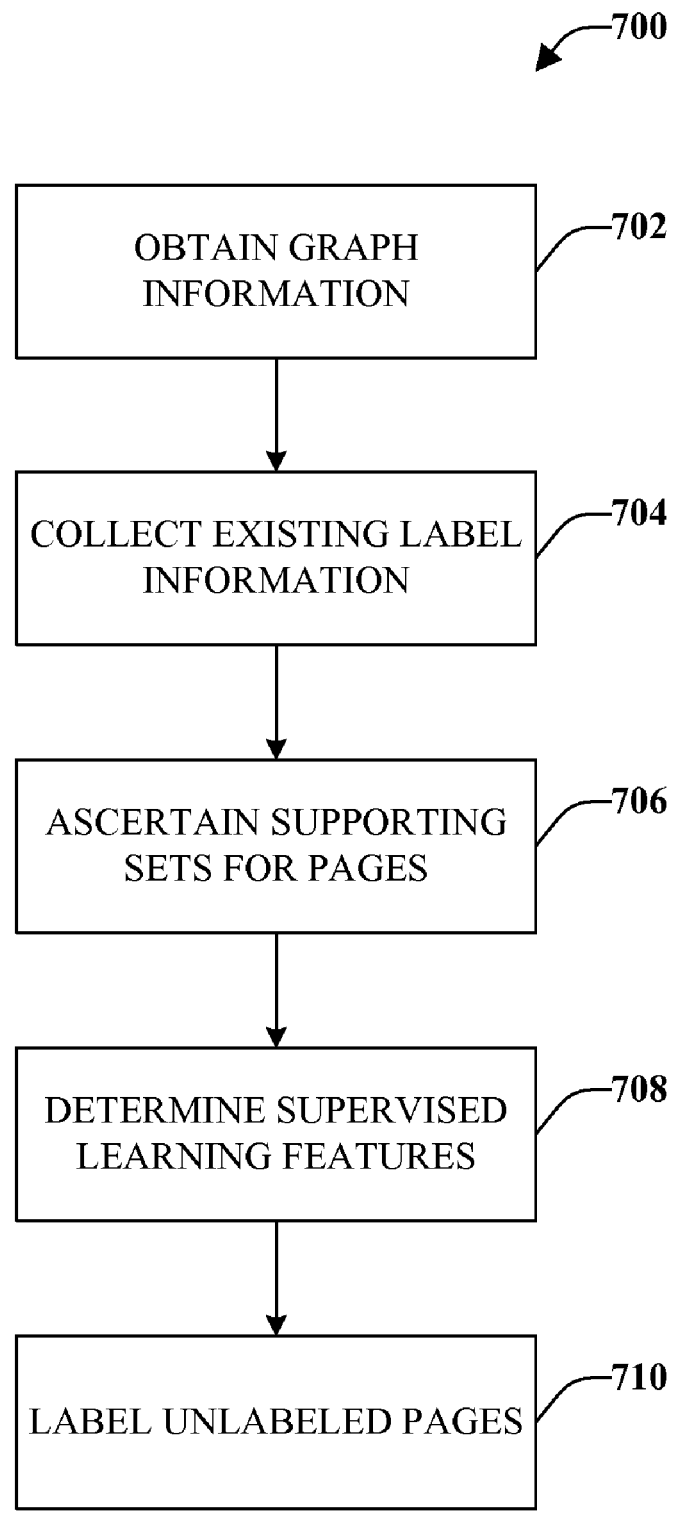
FIG. 7 illustrates an exemplary methodology that facilitates identifying spam pages based upon supervised features.
Figure 8:
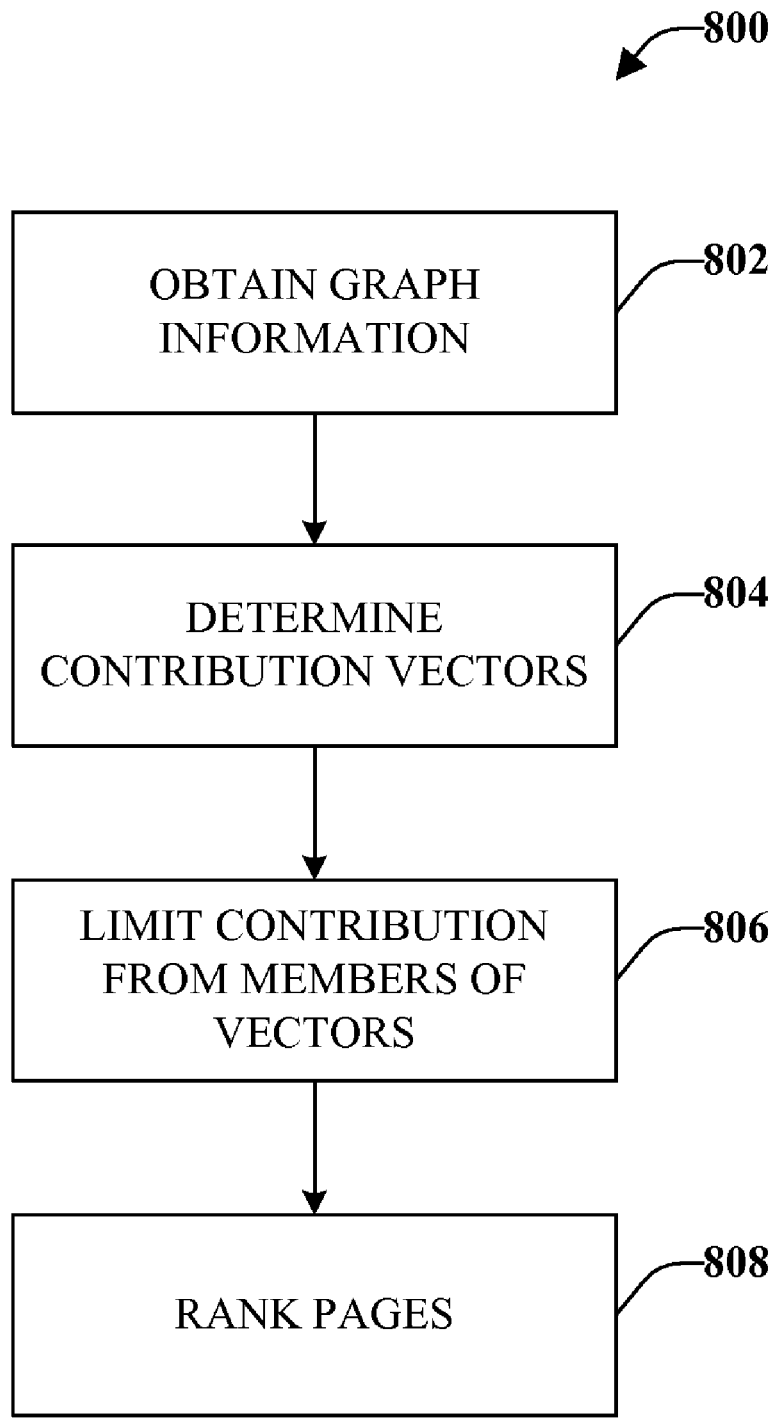
FIG. 8 illustrates an exemplary methodology facilitates limiting individual contributions to an overall rank of a page.

FIGS. 6-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a method 600 that facilitates labeling a web page as spam or non spam. At reference numeral 602, information relating to a graph is obtained. A web of content (e.g., the World Wide Web) can be represented as a graph defined by a set of vertices (e.g., web pages) and a set of edges between vertices (e.g., hyperlinks that connect web pages). Accordingly, a region of a web can be presented as graph information to aide in evaluating characteristics of the region of the web. At reference numeral 604, supporting sets for one or more target vertices or pages included in the obtained graph information are ascertained. Supporting sets can be based upon contribution vectors of vertices or pages. A contribution vector for a particular page includes a list of other pages in the graph that have an outgoing edge (e.g. a link) that references the particular page. The contribution vector further includes, for each page in the vector, an amount of contribution to an overall rank of the particular page. A supporting set of the particular page or target page can be established as all pages in the contribution vector that contribute an amount greater some parameterized threshold. Thus, supporting sets are sets of pages that contribute most to ranks of target pages.

At reference numeral 606, unsupervised learning features are determined. According to an aspect, the unsupervised learning features are evaluated based upon the supporting sets ascertained at reference numeral 604. The unsupervised learning features can include at least one of a size of a supporting set of a target vector, a percentage of total contribution provided by pages in the supporting set, an $l_2$ norm of the supporting set, or a conductance of the supporting set. At reference numeral 608, pages or vertices in the obtained graph are labeled as spam or non spam based in part on the determined unsupervised learning features. For example, page is likely spam if the size of the supporting set is small and a large percentage of total contribution is derived from the small supporting set.

FIG. 7 depicts a method 700 that facilitates labeling a web page in accordance with an aspect of the subject disclosure. At reference numeral 702, information relating to a web graph is obtained. At reference numeral 704, label information is collected. The label information includes existing labels of pages in the web graph. For example, the web graph obtained at reference numeral 702 can contain pages previously labeled as spam or non spam. At reference numeral 706, supporting sets of target pages are ascertained. At reference numeral 708, supervised learning features are determined. The supervised learning features are evaluated based in part on the ascertained supporting sets as well as the collected label information. The supervised learning features can include at least one of a ratio of pages in the supporting set previously labeled as spam or a percentage of contribution derived from spam pages in the supporting set relative to the total contribution of the supporting set. At reference numeral 710, unlabeled pages in the obtained web graph are labeled spam or non spam based upon analysis of the determined supervised learning features. For example, an unlabeled page that has a large number of spam pages in a supporting set and the spam pages contribute heavily to overall rank possesses indications of being a spam page.

FIG. 8 illustrates a method 800 that facilitates ranking pages in a web graph based upon link contributions from neighboring pages. The method 800 commences at reference numeral 802 where information on at least a region of a web graph is obtained. The region can include a target page as well as pages that link to the target page. In addition, the region can include an entirety of the web graph. At reference numeral 804, contribution vectors are determined. The contribution vectors can include a single contribution vector associated with a target page or a plurality of contribution vectors that correspond to each page in the obtained web graph. The contribution vector of a target page indicates all pages that contribute to a rank of the target page and the amount contributed by each page. It is to be appreciated that an approximate contribution vector can be determined. At reference numeral 806, the contribution vectors are processed to limit individual contributions to no greater than a predetermined threshold value. A restriction on an amount of individual contribution mitigates link structure engineering where a spam page receives a large total contribution from a small number of other pages. At reference numeral 808, pages in the web graph are ranked based in part on the adjusted contribution vectors.

Figure 9:
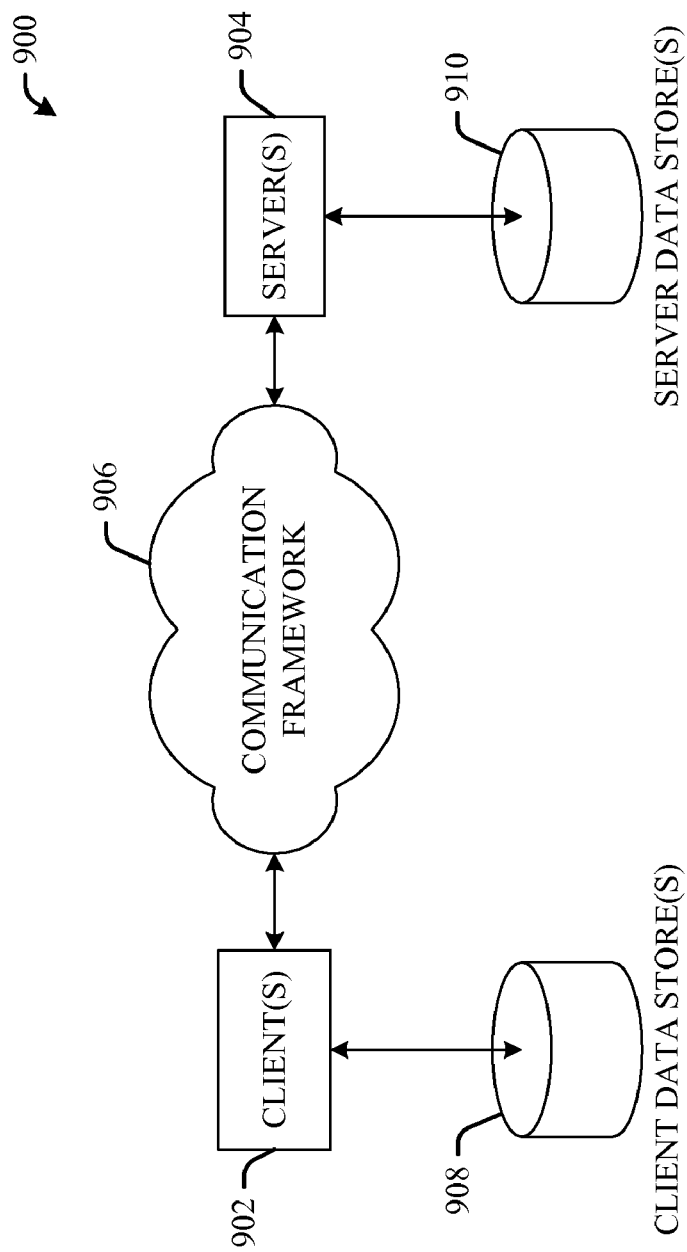
FIG. 9 is a schematic block diagram illustrating a suitable operating environment.
Figure 10:
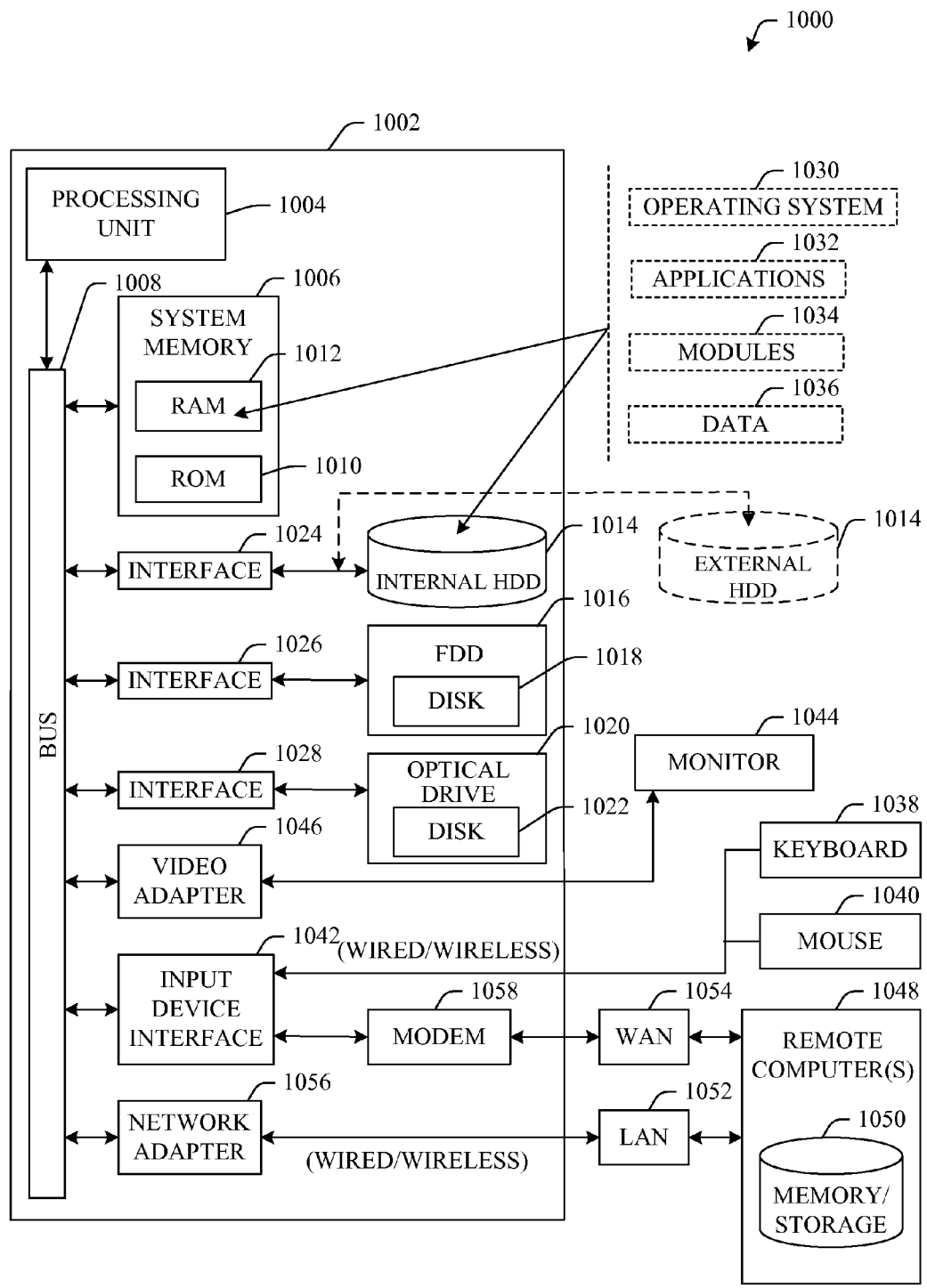
FIG. 10 is a schematic block diagram of a sample computing environment.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices).

The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates reducing spam in search results, comprising:
    one or more processors; and
    memory, communicatively coupled to the one or more processors, for storing:
        an interface that obtains web graph information associated with a web graph;
        a spam detection component that determines one or more features based at least in part on the web graph information, the one or more features indicating pages of the web graph that are spam; and
        a robust rank component that ranks at least one page of the web graph, the robust rank component including a contribution limiting component that restricts a contribution of a page in a supporting set of the at least one page, the contribution limiting component decreasing the contribution of the page in the supporting set to a value no greater than a predetermined threshold.

2. The system of claim 1, wherein the spam detection component includes a contribution vector component that ascertains a contribution vector of a target page in the web graph, the contribution vector including pages in the web graph that contribute to a rank of the target page.

3. The system of claim 2, wherein the contribution vector further indicates an amount of contribution for each included page.

4. The system of claim 2, wherein the spam detection component further includes a supporting set component that evaluates a supporting set of the target page based at least in part on the contribution vector.

5. The system of claim 4, wherein the supporting set of the target page includes pages of the contribution vector that provide an amount of contribution greater than the threshold.

6. The system of claim 4, wherein the spam detection component further includes an unsupervised feature component that generates one or more unsupervised learning features based at least in part on the supporting set and contribution vector of the target page.

7. The system of claim 6, wherein the unsupervised learning features facilitate labeling the target page as one of a spam page or a non spam page.

8. The system of claim 6, wherein the unsupervised learning features include at least one of a size of the supporting set of the target vector, a percentage of total contribution to the target page provided by pages in the supporting set of the target page, and an $l_2$ norm of the contribution provided by pages in the supporting set of the target page or a conductance of the supporting set of the target page.

9. The system of claim 4, wherein the interface further collects preexisting label information related to the obtained web graph information, the preexisting label information indicating pages in the web graph previously labeled as one of spam or non spam.

10. The system of claim 9, wherein the spam detection component further includes a supervised features component that generates one or more supervised learning features based at least in part on the supporting set of the target page and the preexisting label information.

11. The system of claim 10, wherein the supervised features component determines a set of pages included in the supporting set of the target page that are labeled as spam.

12. The system of claim 11, wherein the supervised learning features include at least one of a ratio between the size of the set of spam pages in the supporting set of the target page and the supporting set of the target page or a ratio of the contribution derived from pages labeled spam to the total contribution provided by pages in the supporting set of the target page.

13. The system of claim 1, further comprising an approximation component that produces an approximate contribution vector of a target page based at least in part on a local region of the web graph.

14. The system of claim 13, wherein the approximation component generates the approximate contribution vector based at least in part on an approximate error parameter, an overall rank of the target page and a teleportation parameter.

15. The system of claim of claim 14, wherein the spam detection component employs the approximate contribution vector generated by the approximation component to determine the one or more features.

16. A method that facilitates reducing a rank of spam pages in a web graph, comprising:
    evaluating, by a computing device, a contribution vector of a target page in the web graph, the contribution vector including individual contributions of other pages in the web graph to the target page;
    ascertaining, by the computing device, a supporting set of the target page, the supporting set including pages in the contribution vector that provide a contribution above a pre-determined threshold;
    determining, by the computing device, if contributions from pages in the supporting set exceed a predetermined maximum value; and
    restricting, by the computing device, the determined contributions to no more than the predetermined maximum value.

17. The method of claim 16, further comprising summing a minimum of the contributions of pages in the web graph and the threshold value to ascertain an overall rank of the target page.

18. The method of claim 16, wherein the evaluating the contribution vector includes evaluating an approximate contribution vector in accordance with an approximation error parameter, the approximate contribution vector being based upon local approximations of a region of the web graph.

19. A system that facilitates reducing spam created via engineered link structures, comprising:
    one or more processors; and
    computer-executable instructions that, when executed by the one or more processors, cause the one or more processors to perform operations comprising:
        obtaining an approximation of a contribution vector for a target page;
        evaluating an approximate supporting set based upon the approximation of the contribution vector;
        determining one or more unsupervised learning features according to the approximate supporting set;
        ascertaining one or more supervised learning features based at least in part on the approximate supporting set and a set of preexisting labels; and
        labeling the target page as one of spam or non spam based at least in part on the unsupervised learning features or the supervised learning features.

* * * * *